(12) United States Patent
Finkelstein et al.

(10) Patent No.: US 11,748,243 B2
(45) Date of Patent: Sep. 5, 2023

(54) INTELLIGENT GENERATION OF PAGE OBJECTS FOR USER INTERFACE TESTING

(71) Applicant: salesforce.com, inc., San Francisco, CA (US)

(72) Inventors: Charles Finkelstein, Woodinville, WA (US); Trevor James Bliss, Alameda, CA (US)

(73) Assignee: Salesforce, Inc., San Francisco, CA (US)

( * ) Notice: Subject to any disclaimer, the term of this patent is extended or adjusted under 35 U.S.C. 154(b) by 96 days.

(21) Appl. No.: 17/302,210

(22) Filed: Apr. 27, 2021

(65) Prior Publication Data

US 2022/0365872 A1  Nov. 17, 2022

(51) Int. Cl.
G06F 11/36 (2006.01)
G06F 16/958 (2019.01)
G06N 3/08 (2023.01)

(52) U.S. Cl.
CPC ...... *G06F 11/3688* (2013.01); *G06F 11/3684* (2013.01); *G06F 16/986* (2019.01); *G06N 3/08* (2013.01)

(58) Field of Classification Search
CPC .. G06F 11/36; G06F 11/3664; G06F 11/3672; G06F 11/3684
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Kamini B Patel

(74) *Attorney, Agent, or Firm* — Weaver Austin Villeneuve & Sampson LLP

(57) ABSTRACT

Systems and methods for performing user interface (UI) test automation may include receiving a document object model (DOM) associated with a web application, the web application having one or more web pages; generating a generic object representation of the web application based on the DOM using a page object model; generating a page object based on the generic page object representation in a first programming language; and storing the page object in the first programming language in a database to be accessed by test scripts associated with a UI test automation of the web application.

20 Claims, 10 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,171,460 B2 * | 5/2012 | Pizzoli .................... G06F 9/454 |
| | | 717/124 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,116,660 B2 | 10/2018 | Chasman et al. |
| 10,129,258 B2 | 11/2018 | Chasman et al. |
| 10,447,672 B2 | 10/2019 | Venkiteswaran et al. |
| 10,846,110 B2 | 11/2020 | R et al. |
| 10,983,904 B1 | 4/2021 | Sundararaman et al. |
| 11,481,313 B2 | 10/2022 | Stump et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |

(56) References Cited

U.S. PATENT DOCUMENTS

| | | |
|---|---|---|
| 2004/0268299 A1 | 12/2004 | Lei et al. |
| 2004/0268311 A1* | 12/2004 | Pizzoli ............... G06F 9/451 |
| | | 717/124 |
| 2005/0050555 A1 | 3/2005 | Exley et al. |
| 2005/0091098 A1 | 4/2005 | Brodersen et al. |
| 2005/0125188 A1* | 6/2005 | Eden ............... G06F 11/3688 |
| | | 702/121 |
| 2005/0223360 A1* | 10/2005 | Seeman ........... G06F 11/3688 |
| | | 717/124 |
| 2005/0228644 A1* | 10/2005 | Wang ............... G06F 11/3664 |
| | | 704/10 |
| 2005/0229161 A1* | 10/2005 | Wang ............... G06F 11/3696 |
| | | 717/125 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0210748 A1* | 8/2009 | Hohmann ........ G06F 11/3696 |
| | | 714/E11.178 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212435 A1* | 8/2013 | Qiu .................... G06F 11/263 |
| | | 714/E11.178 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1* | 8/2013 | Jakobson ........... G06Q 30/0241 |
| | | 709/204 |
| 2013/0247216 A1 | 9/2013 | Cinarkaya et al. |
| 2014/0047413 A1* | 2/2014 | Sheive ................ H04L 65/403 |
| | | 717/110 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0246467 A1* | 8/2016 | Jemiolo ................ G06F 16/22 |
| 2017/0212666 A1* | 7/2017 | Hawkins, III ........ G06F 3/0481 |
| 2018/0152450 A1* | 5/2018 | Chasman ............... G06F 16/80 |
| 2018/0152456 A1* | 5/2018 | Chasman ........... G06F 21/6218 |
| 2019/0036929 A1 | 1/2019 | Chasman et al. |
| 2019/0386971 A1 | 12/2019 | Venkiteswaran et al. |
| 2020/0351176 A1* | 11/2020 | Venkiteswaran ..... G06F 16/953 |
| 2021/0136158 A1* | 5/2021 | Finkelstein ........... H04L 67/303 |
| 2021/0334593 A1 | 10/2021 | Vo et al. |
| 2021/0374040 A1 | 12/2021 | Kumar et al. |
| 2022/0156168 A1 | 5/2022 | Panikkar et al. |
| 2022/0237107 A1 | 7/2022 | Subbunarayanan et al. |
| 2022/0365870 A1 | 11/2022 | Neumann et al. |

OTHER PUBLICATIONS

U.S. Non-Final Office Action dated Nov. 10, 2022 in U.S. Appl. No. 17/304,499.

U.S. Notice of Allowance dated Dec. 23, 2022 in U.S. Appl. No. 17/304,499.

* cited by examiner

INTELLIGENT GENERATION OF PAGE OBJECTS FOR USER INTERFACE TESTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to test automation of applications.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

A user interface (UI) associated with a web application may allow a user to interact with the web application through a web browser. UI testing is a process that may be used to verify whether the UI operates as desired. For example, the UI testing may validate data entry, data values, selection of a button, navigation from one web page to another web page of a web application, passing of data values, and other operations that may relate to interactions between a user and a web application. When there is an update to a UI element of the UI, a test script associated with the UI element may need to be updated. There may be many test scripts associated with a UI element, and the process of updating the test scripts can be time consuming.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
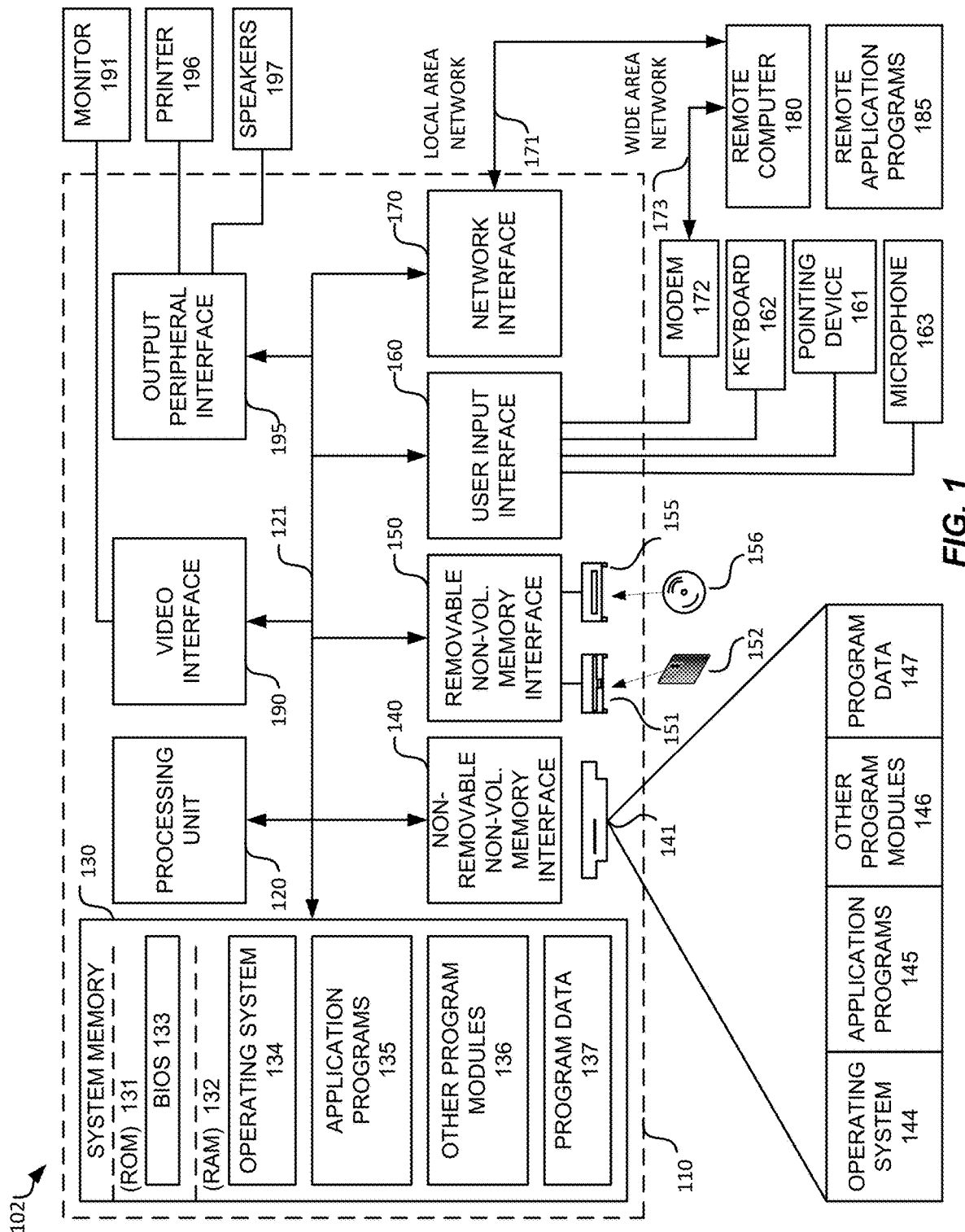
FIG. 1 shows a diagram of an example computing system that may be used with some implementations.

In some implementations, a user interface (UI) test automation model is disclosed. The UI test automation model (also referred to as UTAM) may include using a neural network configured to receive data associated with UI codes and generate generic page object representation based on a page object model. The generic page object representation may be generated using a data interchange format. One example of such data interchange format is JavaScript Object Notation (JSON). A page object compiler may be configured to receive the generic page object representation and generate page objects in different programming languages. The page objects may then become available to test developers to generate test scripts and test the UI associated with the UI codes.

Some implementations of the UI test automation model described herein may enable test developers of web applications to experience less impact as the web applications change from release to release causing changes to the document object model (DOM) of the web pages and components in the web applications. The UI test automation model may require less effort from the test developers to update page objects for each changed component as compared to having to rewrite the test scripts, thus resulting in reduced testing time and updating time when the web applications go through release changes.

Examples of systems and methods associated with implementing a UI test automation model will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed implementations may include a method for implementing a UI test automation model and may include receiving, by a server computing system, a document object model (DOM) associated with a web application, the web application including one or more web pages; generating, by the server computing system, a generic page object representation based at least on the DOM, the generic page object representation associated with a web page of the web application, the generic page object representation generated using a data interchange format; generating, by the server computing system, a first page object based on the generic page object representation in a first programming language, the first page object associated with the web page of the web application; and storing, by the server computing system, the first page object in the first programming language in a database to be accessed by test scripts associated with a first UI test automation of the web application.

The disclosed implementations may include a system for performing UI test automation and may include one or more processors, and a non-transitory computer readable medium storing a plurality of instructions, which when executed, cause the one or more processors of a server computing system to cause receiving a document object model (DOM) associated with a web application, the web application including one or more web pages; generating a generic page object representation based at least on the DOM, the generic page object representation associated with a web page of the web application, the generic page object representation generated using a data interchange format; generating a first page object based on the generic page object representation in a first programming language, the first page object associated with the web page of the web application; and storing the first page object in the first programming language in a database to be accessed by test scripts associated with a first UI test automation of the web application.

The disclosed implementations may include a computer program product comprising computer-readable program code to be executed by one or more processors of a server computing system when retrieved from a non-transitory computer-readable medium, the program code including instructions to receive a document object model (DOM) associated with a web application, the web application including one or more web pages; generate a generic page object representation based at least on the DOM, the generic page object representation associated with a web page of the web application, the generic page object representation generated using a data interchange format; generate a first page object based on the generic page object representation in a first programming language, the first page object associated with the web page of the web application; and store the first page object in the first programming language in a database to be accessed by test scripts associated with a first UI test automation of the web application.

While one or more implementations and techniques are described with reference to performing UI test automation using a UI test automation model implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the claimed subject matter. Further, some implementations may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. For example, the migrated data may be stored in a source control system and then exposed through a virtual file system.

Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 is a diagram of an example computing system that may be used with some implementations. The computing system 110 in diagram 102, may be used by a developer to develop test scripts to test the UI of a web application. The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples with various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random-access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all the elements described above relative to the computing system 110. The logical connections depicted in FIG. 1 include a local area network (LAN) 171 and a wide area network (WAN) 173 but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some implementations may be carried out on a computing system such as that described with respect to FIG. 1. However, some implementations may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
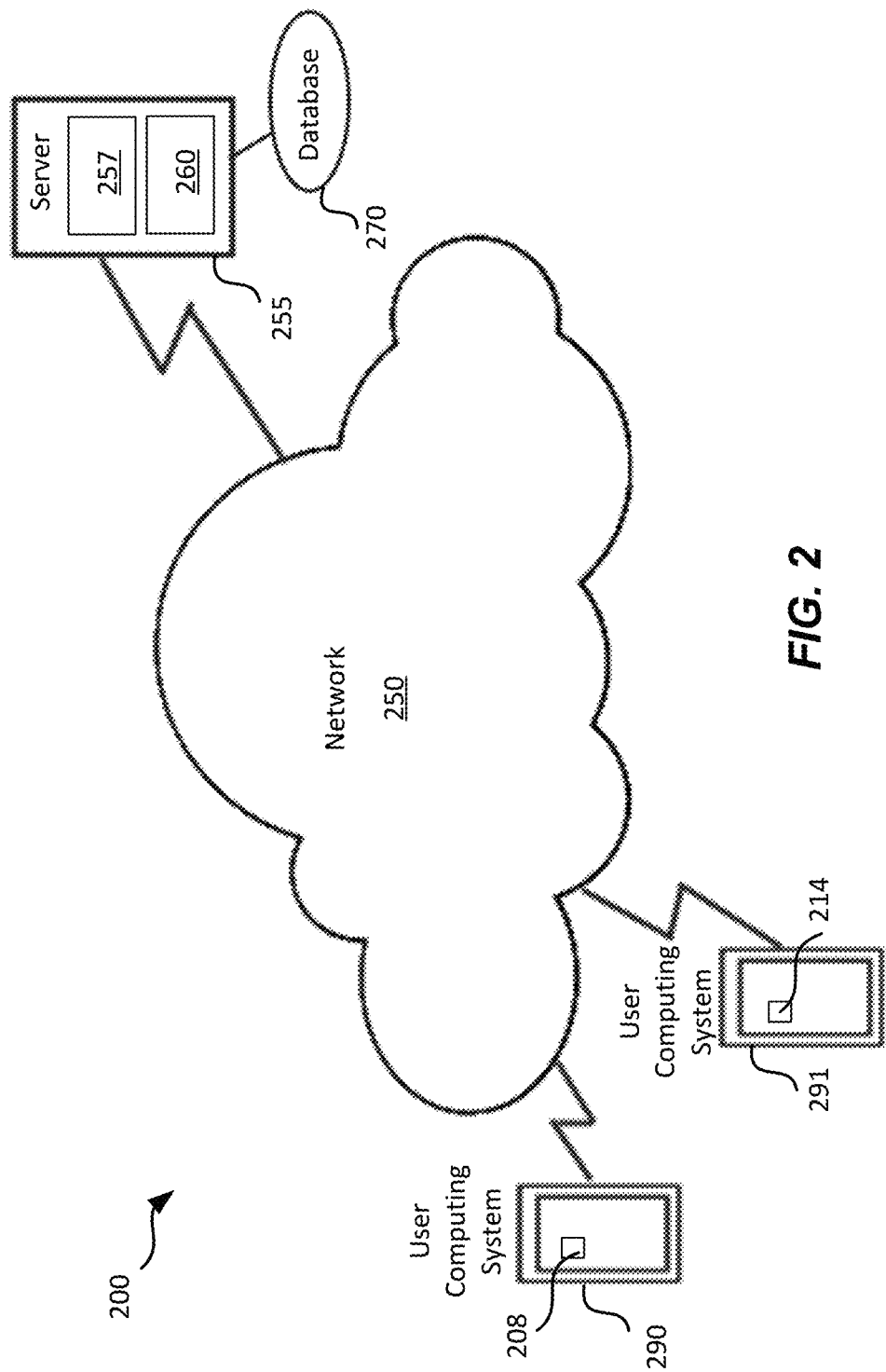
FIG. 2 shows a diagram of an example network environment that may be used with some implementations.

FIG. 2 shows a diagram of an example network environment that may be used with some implementations. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 via the network 250. The server computing system 255 may be coupled with database 270.

Each of the computing systems 290 and 291 may include an application module such as module 208 or 214. For example, a user may use the computing system 290 and the application module 208 to connect to and communicate with the server computing system 255 and log into application 257 (e.g., a Salesforce.com® application). For example, the application 257 may be Salesforce Lightning application from Saleforce.com of San Francisco, Calif.

The server computing system 255 may be configured to include neural application 260 which may be configured as a deep learning application. For example, the neural application 260 may be the Einstein Artificial Intelligence (AI) application by Salesforce.com of San Francisco, Calif. A developer may use the computing system 290 to initiate the neural application 260 to generate generic page object representation for a web application or component running in the server computing system 255. The generic page object representation and associated page objects may be stored in the database 270. A test developer may use the computing system 291 to develop test scripts to test the UI associated with the web application. One example of a web application is Salesforce Lightning application.

Figure 3:
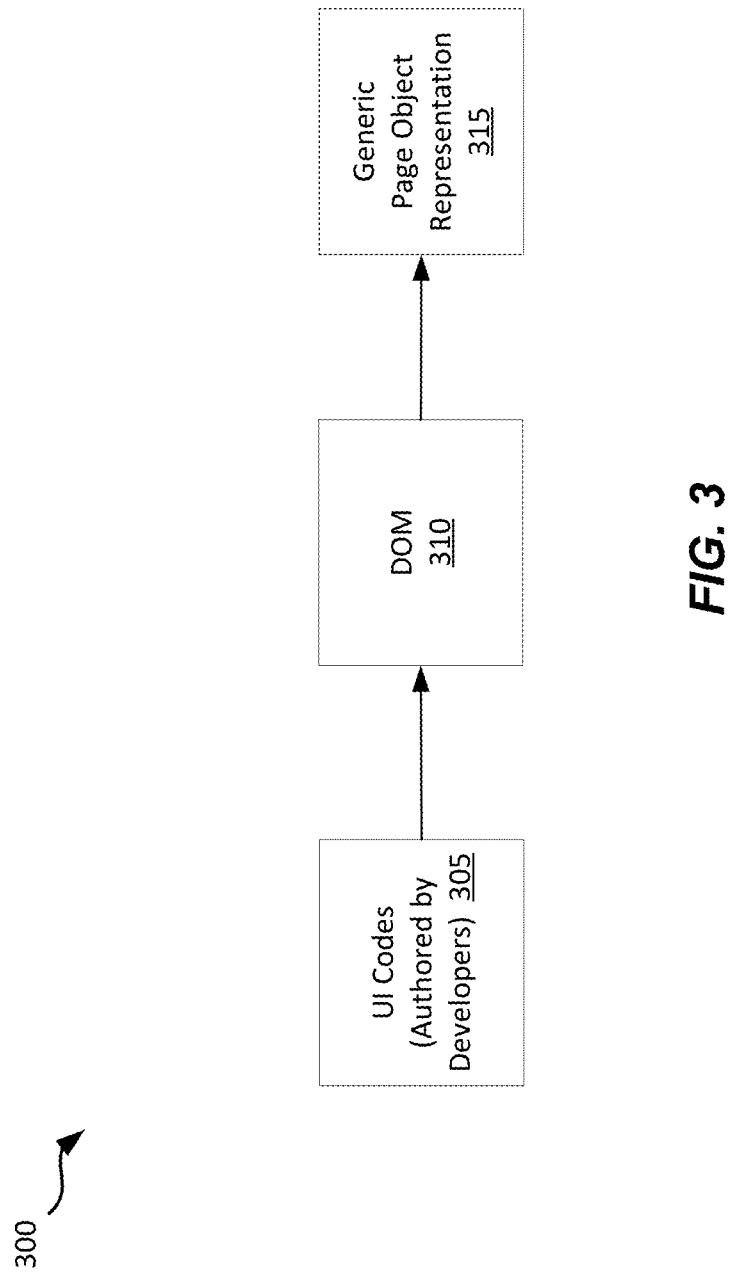
FIG. 3 is an example block diagram that shows relationship between a generic page object representation and the UI codes, in accordance with some implementations.

FIG. 3 is an example block diagram that shows relationship between a generic page object representation and the UI codes, in accordance with some implementations. Diagram 300 includes UI code 305 associated with a web application. The UI code 305 may be generated by a developer and may be stored in the database 270 associated with a server computing system 255. For example, when a developer provides a URL of a web application via a browser, the server computing system 255 may send the UI code 305 to the browser. The UI code 305 may be written using a markup language such as, for example, eXtensible Markup Language (XML) or Hyper Text Markup Language (HTML). When a web page of the web application is loaded, the browser may generate a Document Object Model (DOM) 310 of the web page. The DOM 310 may represent the web page as nodes and objects using a tree structure and may be used as programming interface to the web page for programs to access and update the content, structure, and style of the web page.

The generic page object representation 315 may be generated based on one or more of the UI code 305 and the DOM 310. The generic page object representation 315 may be generated using a page object model which is a design pattern that creates object repository for web UI elements. The page object model is commonly used in Selenium web driver framework for test automation. The page object model may be used to develop page objects for web applications. The page object model may be used to enhance test maintenance and reduce code duplication for test scripts. Using the page object model, each web page of the web application may be represented as a page object class, and the UI elements (e.g., login button element, userid element, password element, etc.) on a web page may be defined as variables on the page object class. For example, there may be a page object class for a home page, and there may be a different page object class for a login page. A UI element on a web page may be located using a locator which may be configured to include a variable associated with the UI element. A test developer may use the variables to develop test scripts. For example, a test script may include code to locate a variable associated with a UI element, and interaction with the UI element may be simulated using test input provided by the test script. Typically, the page objects associated with the Selenium web driver framework are generated using a programming language such as, for example, Java.

For some implementations, the generic page object representation 315 may be generated using a data interchange format such as, for example, JavaScript object notation (JSON). JSON is supported by many different programming languages including, for example, PHP, Python, C#, C++, and Java. Using JSON to develop the generic page object representation may be advantageous because JSON is easy to write and easy to read using human readable text to store and transmit data objects. JSON can be used as a data format for many programming languages. For some implementations, instead of using an object-oriented class to write a page object based on the DOM, the generic page object representation may be developed or authored using JSON based on the DOM. The generic page object representations may be agnostic to any programming language.

Each web page of a web application or component may have a corresponding generic page object representation 315 that defines the UI interface for the test scripts. When there is a release for a web application, a page object generated from a generic page object representation 315 associated with the web application may be made available. A generic page object representation 315 may be composed of other generic page object representation to match the composition of the web application. A page object compiler (described with FIG. 5) may be used to compile the generic page object representations 315 into page objects in different target programming languages. Multiple instances of the page object compiler may be used against a generic page object representation to generate page objects in multiple different languages almost at the same time. For example, two instances of the page object compiler may be used with the generic page object representation to generate a page object in JavaScript and a page object in Java. The output of the page object compiler may be runnable codes. Test scripts may be developed using the JavaScript or Java page objects generated by the page object compiler. A test automation framework may be used to perform the testing with the test scripts.

For some implementations, the UI test automation model described herein may rely on cascading style sheets (CSS) selectors to avoid the need to use potentially problematic XML Path Language (XPath) locators. When a component is refactored to add a div or span, the generic page object representation written in JSON may be updated to match. When the interface to the page object remains the same, the test scripts written against the page object may still work.

The UI test automation model may make it easy to test components that implement Shadow DOM. For some implementations, a grammar may be provided for developers to generate the generic page object representation (also referred to as JSON page object). The grammar may enable developers to model a component's shadow DOM in a shadow object. The page object compiler may be configured to generate methods that cross the shadow boundary to select elements.

The grammar may cover different elements of a generic page object representation including, for example, root element, actionable root element, basic element, custom element, container element, element selector, element filter, compose method, chain method, basic actions, argument types, explicit waits, etc. Following are some examples of the grammar that may be associated with the UI test automation model described herein. For the root element, the root of a generic page object representation may contain the following properties:

- elements (Optional) Array: A nested tree of element objects. An element object can be one of these types:
  Basic element—A UI element required for user interaction or to scope another element.
  Custom element—A nested page object.
  Container element—A slot or div into which other components are injected.
- methods (Optional) Array: Each object declares a public method. A method can be one of these types:
  compose— A method that combines several element actions, like clearing a text field (clear) and entering a value (setText).
  chain— A method that combines getters to reach a deeply nested custom element.
  external—Reserved for future use.
- root (Optional) Boolean: To load a page object from a test, set root to true and add a selector element that points to its most outer (root) element. Any page object that is unique inside the current browser view can be used as a root. A root page object can be loaded directly inside the browser. If a component can be loaded only inside its immediate parent (for example, a navigation item can be loaded only inside a navigation bar), don't mark it as root.
- selector (Optional) Object: If root is true, add a selector that points to its most outer (root) element. The root selector may match the HTML tag name.
- shadow (Optional) Object: A shadow boundary at the root of the page object.
  Contains only an elements property, which is a nested tree of objects. A page object can have elements scoped both inside and outside its shadow root.
- exposeRootElement (Optional) Boolean.
- type (Optional) String.

To make the root element actionable, the root element can be exposed via a public method and the following properties may be added to the root element:

- exposeRootElement Boolean. If set to true, the UI test automation model may create a public method that returns an instance of the element with the given type. The name of the getter is getRoot.
- type (Optional) String. The type of user interaction that the root element supports. One of these values:
  actionable (Default) Exposes actions to check the element state (like presence and visibility) and attributes values, or to wait for the element to reach the state.
  clickable extends actionable and adds click operations.
  editable extends clickable and accepts user entry.

When a component has an HTML, element that need to be in the generic page object representation, a basic element can be declared as an object in an elements array. A basic element can be added only if it's needed for user interactions or to scope other elements. A basic element object can be nested in any elements array: at the root, inside a shadow, or nested inside another basic element. A basic element can have the following properties:

- elements (Optional) Array. Contains a nested tree of element objects that are located inside this basic element.
- filter (Optional) Object. Picks an element from a list or filters a list at run time.
- name (Required) String. The element name, which UI test automation method uses in the getter method name. The value may be unique within the JSON file.
- nullable (Optional, default is false). Boolean. If set to true and the element can't be found inside its parent, the getter method returns null.
- public (Optional, default is false) Boolean. If set to true, the UI test automation method may generate a public method that returns an instance of the element with the given type. The name of the getter is generated automatically from the name property as get<Name> (the value of the name property is capitalized).
- selector (Required) Object. Locates the element inside its immediate parent.
- shadow (Optional) Object. A shadow boundary. Contains only an elements property, which is a nested tree of objects.
- type (Optional) String. The type of user interaction that this basic element supports.
  One of these values:
  actionable (Default) Exposes actions to check the element state (like presence and visibility) and attributes values, or to wait for the element to reach the state.
  clickable extends actionable and adds click operations.
  editable extends clickable and accepts user entry.

Figure 4:
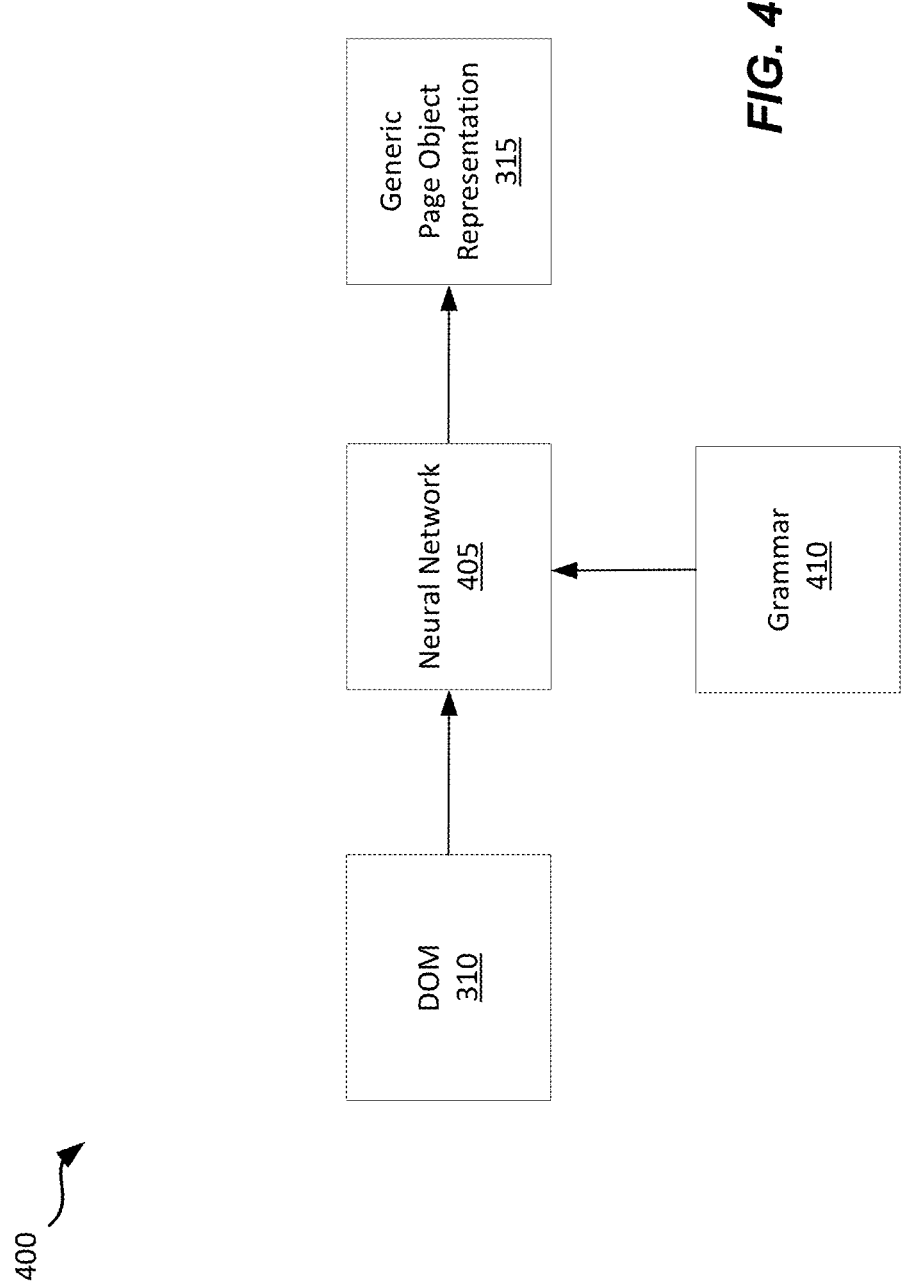
FIG. 4 is an example block diagram that shows using a neural network to generate generic page object representation, in accordance with some implementations.

FIG. 4 is an example block diagram that shows using a neural network to generate generic page object representation, in accordance with some implementations. It may be possible for the generic page object representation to be generated by a neural network instead of being generated by a developer. In diagram 400, the neural network 405 may be configured to receive a DOM 310 and generate generic page object representation 315 based on information included in the DOM 310. The neural network 405 may also use information included in the UI code 305 (shown in FIG. 3). The architecture of the neural network 405 may be based on one or more of a recurrent neural network and a convolutional neural network.

The neural network 405 may initially be trained using training data that may include default or existing sets of DOMs and corresponding generic page object representations set up using the grammar 410. Subsequently, the training data may be expanded to include DOMs and generic page object representations generated by many different developers based on the grammar 410. The neural network 405 may learn from the decisions made by the developers based on mapping the DOMs that the developers use to generate the appropriate generic page object representation. This may help the neural network 405 to make substantially similar authoring decisions made by the developers. For example, the neural network 405 may learn how the different developers make decisions based on context associated with an element including backward, forward, nested and modal contexts.

The more training data is available for the neural network 405 to learn, the more likely the neural network 405 may be able to generate generic page object representation as a developer would. For example, the training data may be available through crowd sourcing from members of developer communities. Test data may be used to determine the accuracy of the generic object representation generated by the neural network 405. For some implementations, the neural network 405 may be the developed based on Einstein Artificial Intelligence (AI) technology from Salesforce.com of San Francisco, Calif.

Figure 5:
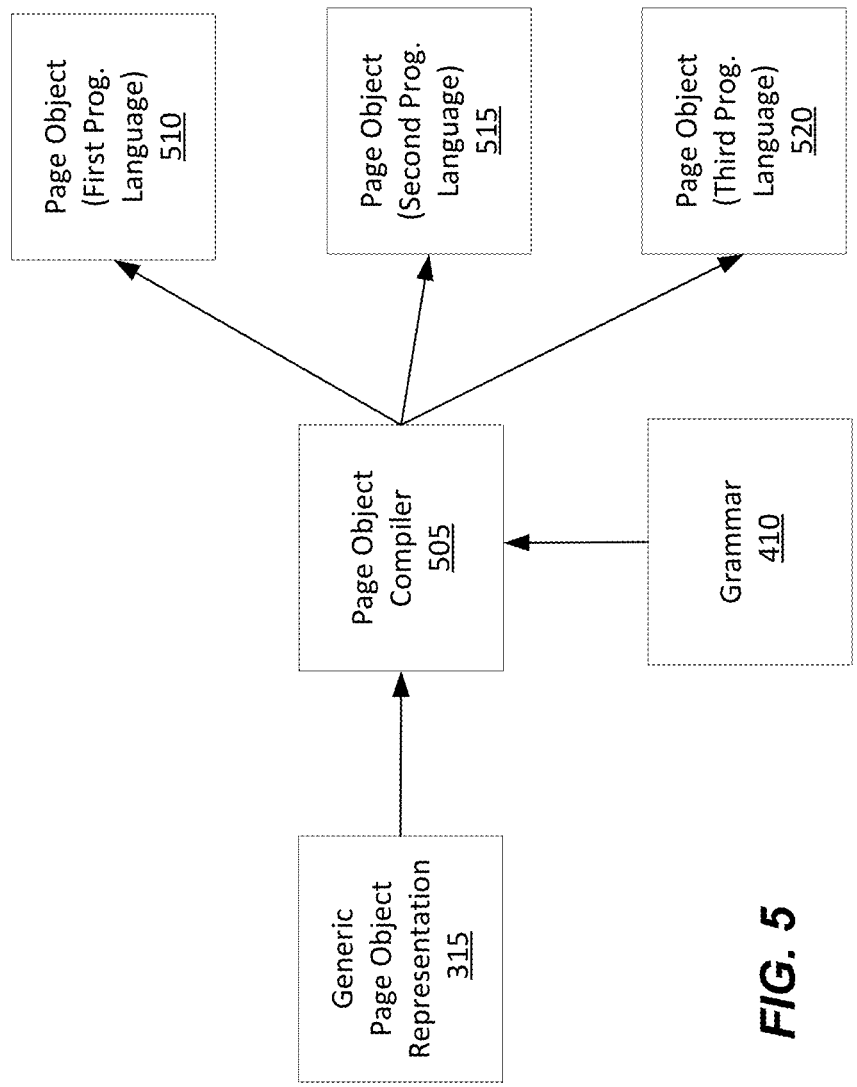
FIG. 5 shows an example of a page object compiler that may be used to compile the generic page object representation, in accordance with some implementations.

FIG. 5 shows an example of a page object compiler that may be used to compile the generic page object representation, in accordance with some implementations. A page object compiler 505 may be used to compile a generic page object representation 315 to generate page objects 510, 515 and 520 in different programming languages. The page object compiler 505 may use the grammar 410 to generate the page objects 510, 515 and 520. For example, the page objects 510 may be generated using Java, the page objects 515 may be generated in JavaScript, and the page objects 520 may be generated in C++. The page object compiler 505 may generate methods that the test developer may chain to select elements. Each of the page objects 510, 515 and 520 may then be packaged together, stored and distributed to developers to develop test scripts to test the web application or component. The test scripts may be developed using a programming language (e.g., as Java, JavaScript, or C++) similar to the programming language associated with the page object generated by the page object compiler 505. The test scripts may be developed using the same programming language as the programing language used to develop the web application. The test scripts may be developed using a test automation framework, such as, for example, Selenium framework.

Following are some examples that show the generation of the generic page object representation and the corresponding compiled page object based on an example DOM. The web page may include a string of alphanumeric text such as, for example, "Hello ◉◉◉!"

A DOM tree view that corresponds to the web page may be as follows:
body{child #0}
|---div(main){child #0}
|---|---h1{child #0}
|---|---|---span(world){child #0}

A generic page object representation that is generated using JSON and based on the DOM and the information displayed on the web page may be as follows:

```
{
    "root": true,
    "selector": {
        "css": "body"
    },
    "elements": [
        {
            "name": "world",
            "selector": {
                "css": ".world"
            },
            "public": true
        }
    ]
}
```

A compiled version of the generic page object representation in JavaScript may be as follows:

```
import { By as _By, UtamBaseRootPageObject as _UtamBaseRootPageObject,
ActionableUtamElement as _ActionableUtamElement } from '@utam/core';
async function _utam_get_world(driver, root) {
    let _element = root;
    const _locator = _By.css('.world');
    return _element.findElement(_locator);
}
export default class UnknownPageObjectName extends _UtamBaseRootPageObject {
    constructor(driver, element, locator = _By.css('body')) {
        super(driver, element, locator);
    }
    async _getRoot( ) {
        const driver = this.driver;
        const root = await this.getRootElement( );
        return new _ActionableUtamElement(driver, root);
    }
    async getWorld( ) {
        const driver = this.driver;
        const root = await this.getRootElement( );
        let element = await _utam_get_world(driver, root,);
        element = new _ActionableUtamElement(driver, element);
        return element;
    }
}
```

A UI test that use the JavaScript page object may be as follows:

```
//Import a root page object
import HelloWorldRoot from 'tutorial/helloWorld';
runPlaygroundTest(async ( ) => {
    // Load the page object
    const helloWorldRoot = await utam.load(HelloWorldRoot);
    assert.ok(helloWorldRoot instanceof HelloWorldRoot);
    // Call a UTAM-generated method to get an element.
    const worldIcon = await helloWorldRoot.getWorld( );
    assert.ok(worldIcon);
```

-continued

```
    const emoji = await worldIcon.getText( );
    assert.strictEqual(emoji, '🌍🌍🌍');
    // A developer can add a debugger
    // call console.log( )
    // and use Dev Tools
});
```

Figure 6:
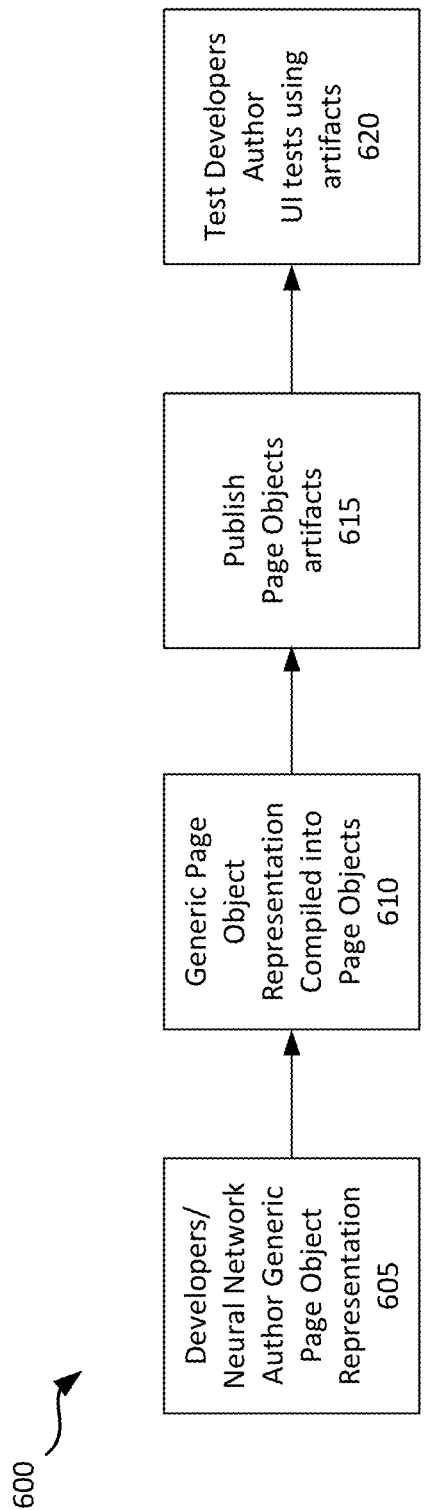
FIG. 6 is an example diagram of a continuous integration (CI) pipeline that includes using the UI test automation model, in accordance with some implementations.

FIG. 6 is an example diagram of a continuous integration (CI) pipeline that includes using the UI test automation model, in accordance with some implementations. As shown in the CI pipeline 600, the generic page object representations may be developed or authored by developers or by a neural network for their components at block 605. The generic page object representations may be authored using JSON. The JSON generic page object representations may be compiled by a page object compiler into runnable codes at block 610. The runnable codes may be packaged or aggregated together and published as artifacts at block 615. For example, the runnable codes may be packaged together using Java Archive (JAR) file format. The runnable codes may be downloaded from a repository by test developers to use with test scripts to test the UI associated with the components at block 620. For example, the CI pipeline 600 may be implemented using Jenkins, an open source project for automation server.

Figure 7:
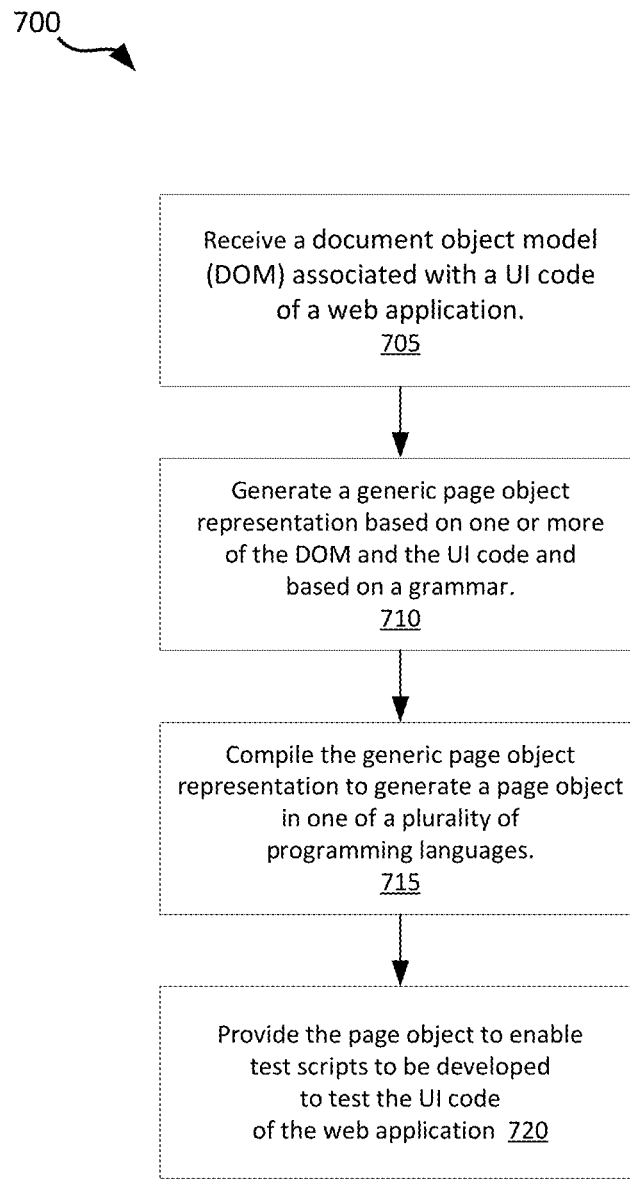
FIG. 7 is an example flow diagram of a process that may be used to generate the generic page object representation and the corresponding page objects in a programming language, in accordance with some implementations.

FIG. 7 is an example flow diagram of a process that may be used to generate the generic page object representation and the corresponding page objects in a programming language, in accordance with some implementations. The process shown in diagram 700 may be associated with performing UI tests of a web application or component. A web application may be developed for a mobile device or a desktop device using a development framework. One example of a development framework is component framework of Salesforce Lightning from Salesforce.com of San Francisco, Calif. The framework may include tools to develop the UI code for the web application. The UI code associated with a web application may be rendered via a browser such as, for example, Chrome. The UI code may be associated with a DOM generated by the browser. At block 705, a DOM associated with a UI code of a web application may be received. A generic page object representation of the DOM may be generated using a page object model, as shown in block 710. For some implementations, the generic page object representation associated with the DOM may be generated using JSON and a grammar. The generic page object representation may be generated by a developer. For some implementations, the generic page object representation may be generated using machine learning. Training for the machine learning may be based on at least multiple generic page object representations generated by developers.

At block 715, the generic page object representation may be compiled using a page object compiler to generate a page object in one of a plurality of programming languages. The page object compiler may transform the generic page object representation from JSON into a page object in a programming language such as, for example, JavaScript and Java. At block 720, the page objects generated by the page object compiler may be used to generate test scripts. The test scripts may be used to test the UI code or the UI associated with the web application. The techniques described with FIG. 7 may be advantageous because the generic page object representation generated using JSON may be programming language agnostic. The generic page object representation may be used as the main source for generation of page objects in different programming languages used by different test developers.

Figure 8A:
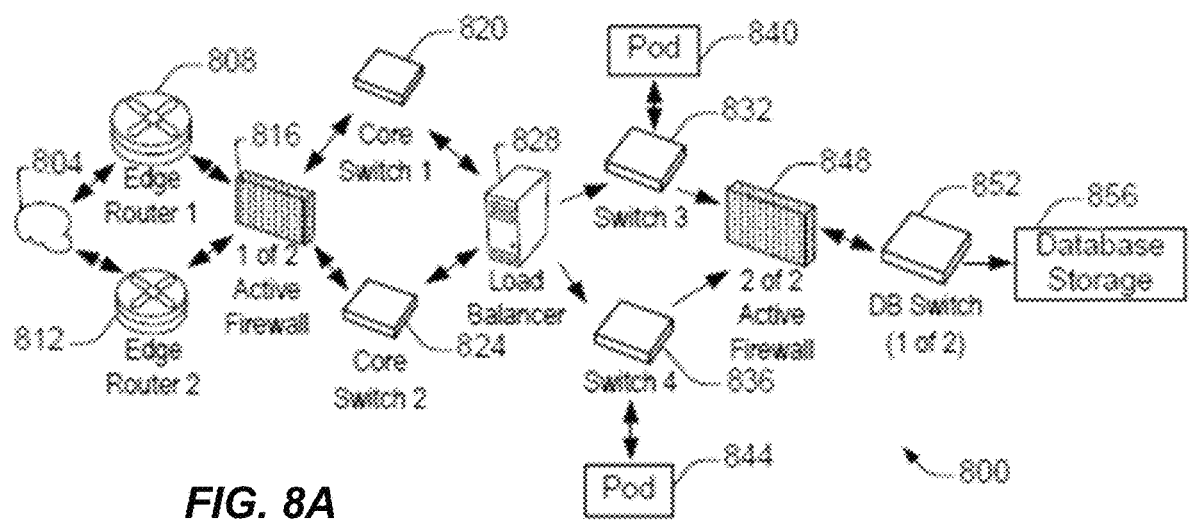
FIG. 8A shows a system diagram illustrating architectural components of an applicable environment, in accordance with some implementations.

FIG. 8A shows a system diagram 800 illustrating architectural components of an on-demand service environment, in accordance with some implementations. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand Services. Communication with the pods may be conducted via pod switches 832 and 836. Components of the on-demand service environment may communicate with a database storage system 856 via a database firewall 848 and a database switch 852.

Figure 8B:
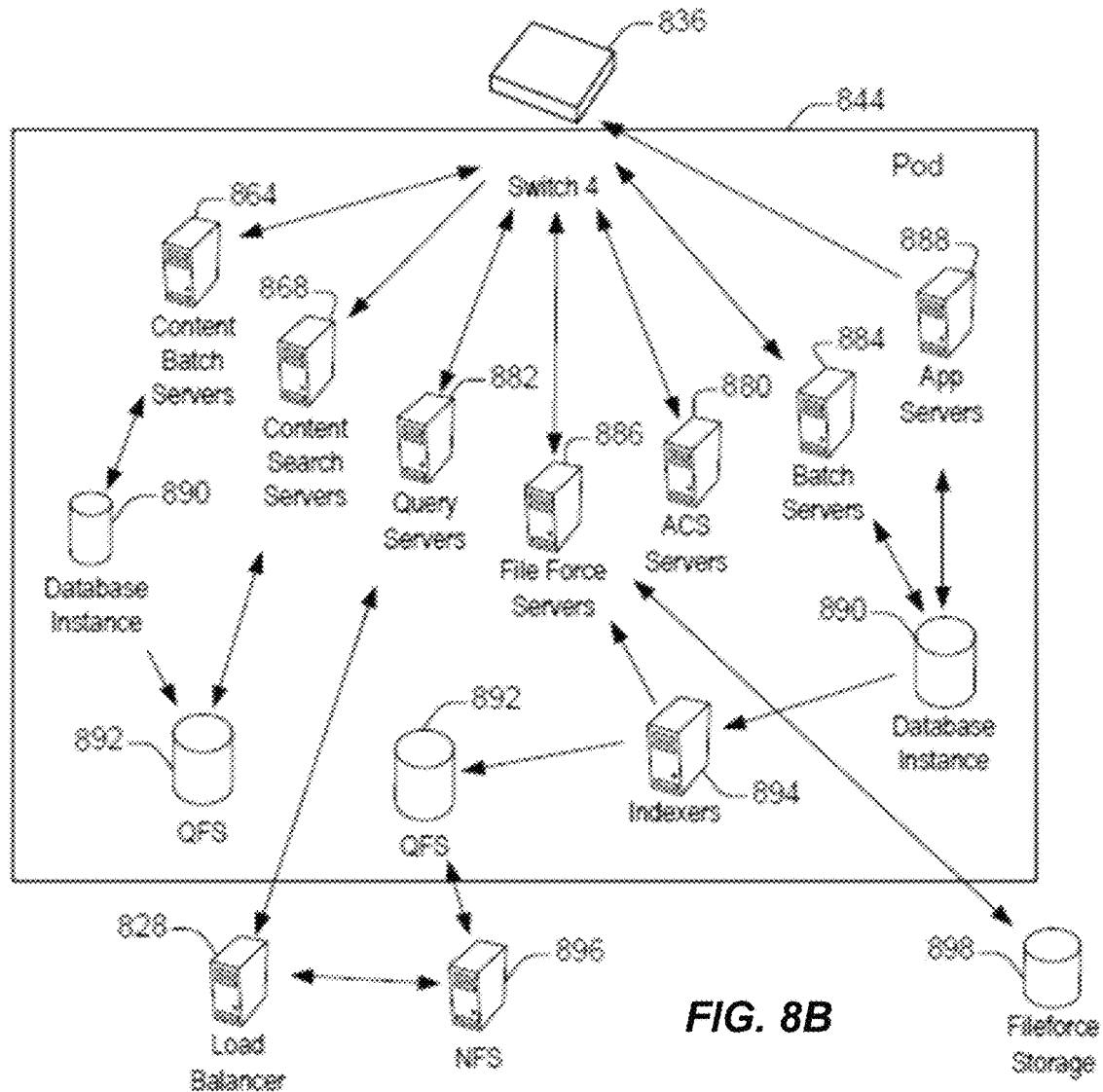
FIG. 8B shows a system diagram further illustrating architectural components of an applicable environment, in accordance with some implementations.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some implementations of an on-demand service environment may include anywhere from one to many devices of each type. Also, the on-demand service environment need not include each device shown in FIGS. 8A and 8B or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some implementations, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand service environment 800. The core switches 820 and 824 may be configured as network bridges that quickly route data between different components within the on-demand service environment. In some implementations, the use of two or more core switches 820 and 824 may provide redundancy and/or reduced latency.

In some implementations, the pods 840 and 844 may perform the core data processing and service functions provided by the on-demand service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some implementations, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one implementation. The pod 844 may be used to render services to a user of the on-demand service environment 800. In some implementations, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may request internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs. For some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some implementations, queries from the query servers 882 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without requiring an additional database call. In some implementations, database information may be transmitted to the indexer 894. Indexer 894 may provide an index of information available in the database 890 and/or QFS 892. The index information may be provided to Fileforce servers 886 and/or the QFS 892.

Figure 9:
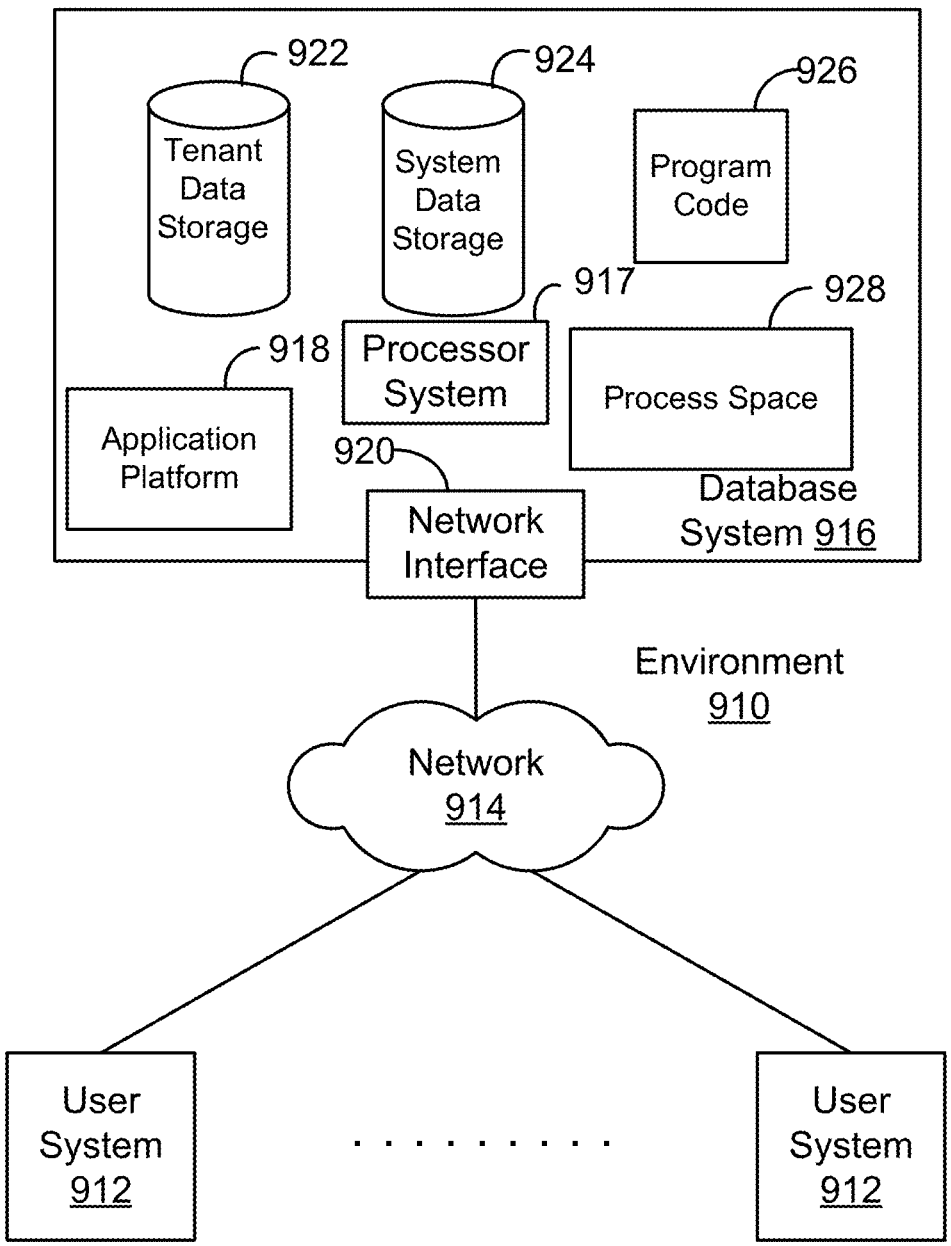
FIG. 9 shows a system diagram illustrating the architecture of a multi-tenant database environment, in accordance with some implementations.
Figure 10:
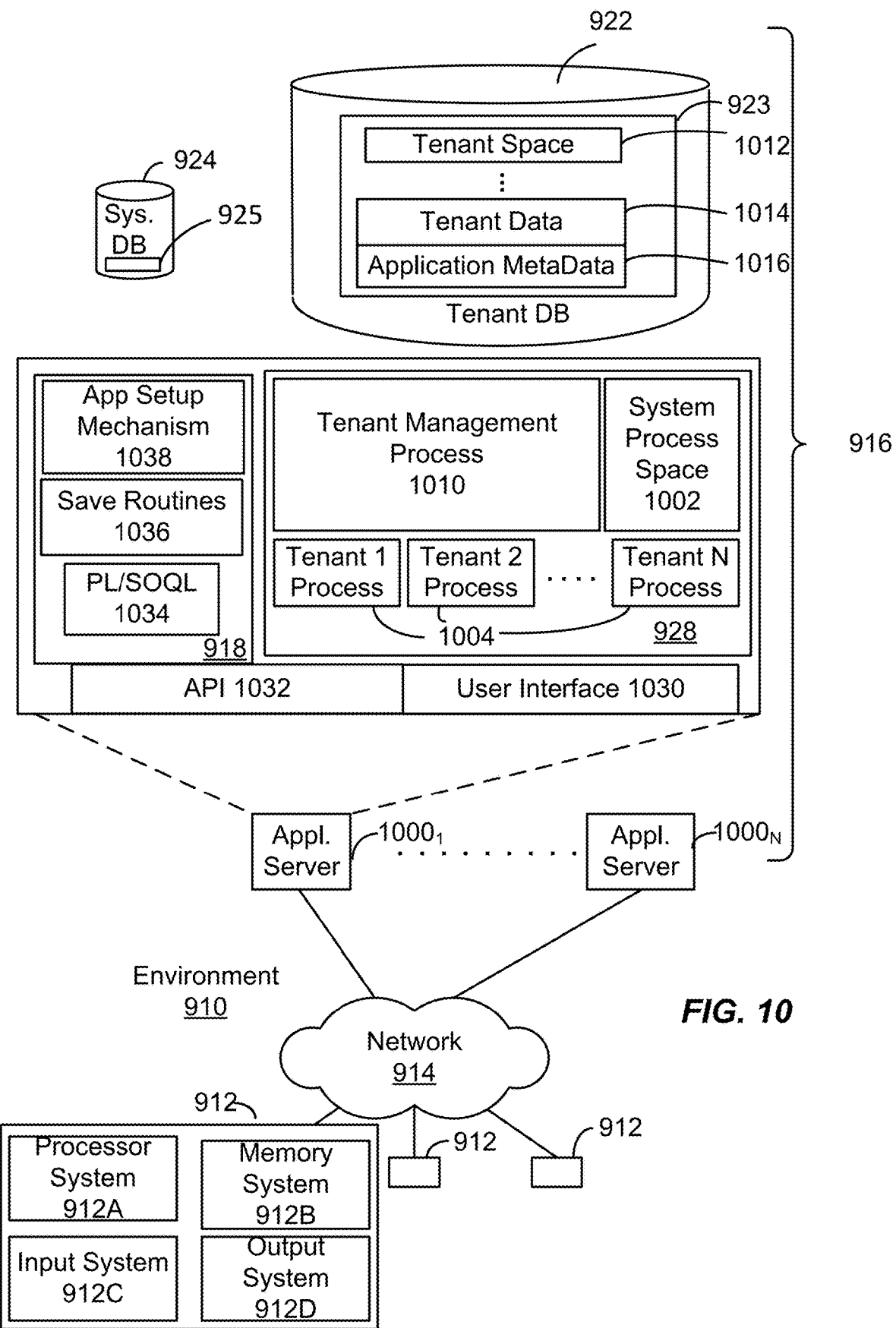
FIG. 10 shows a system diagram further illustrating the architecture of a multi-tenant database environment, in accordance with some implementations.

FIG. 9 shows a block diagram of an environment 910 wherein an on-demand database service might be used, in accordance with some implementations. Environment 910 includes an on-demand database service 916. User system 912 may be any machine or system that is used by a user to access a database user system. For example, any of user systems 912 can be a handheld computing system, a mobile phone, a laptop computer, a workstation, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 916, shown in FIG. 9, implements a web-based customer relationship management (CRM) system. For example, in some implementations, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some implementations. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 1000₁-1000N, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some implementations, therefore, an interface system implementing a load balancing function (e.g., an F5 Big-IP load balancer) is communicably coupled between the application servers 1000 and the user systems 912 to distribute requests to the application servers 1000. In some implementations, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A system for performing user interface (UI) test automation, the system comprising:
   a database system implemented using a server computing system, the database system configurable to cause:
      obtaining a document object model (DOM) associated with a web application, the web application including one or more web pages;
      generating a generic page object representation based at least on the DOM, the generic page object representation associated with a web page of the web application, the generic page object representation generated using a data interchange format;
      generating, by a plurality of instances of a page object compiler, a plurality of page objects based on the generic page object representation in different programming languages, the page objects associated with the web page of the web application; and
      performing the UT test automation for the web application with test scripts generated using at least the page objects in the different programming languages.

2. The system of claim 1, wherein the generic page object representation is agnostic to any programming language.

3. The system of claim 2, wherein the generic page object representation is generated based on a page object model.

4. The system of claim 3, wherein the generic page object representation is generated based on prior generation of a plurality of page object representations.

5. The system of claim 4, wherein the generic page object representation is generated by a neural network trained using at least the prior generation of the plurality of page object representations.

6. The system of claim 5, further comprising:
   storing the page objects in the different programming languages in a database to be accessed by the test scripts.

7. The system of claim 6, wherein the data interchange format is JavaScript Object Notation (JSON), and wherein a first page object is generated by a first instance of a page object compiler and a second page object is generated by a second instance of the page object compiler.

8. A computer-implemented method comprising:
   obtaining, by a server computing system, a document object model (DOM) associated with a web application, the web application including one or more web pages;
   generating, by the server computing system, a generic page object representation based at least on the DOM, the generic page object representation associated with a web page of the web application, the generic page object representation generated using a data interchange format;
   generating, by a plurality of instances of a page object compiler, plurality of page objects based on the generic page object representation in different programming languages, the page objects associated with the web page of the web application; and
   performing, by the server computing system, UT test automation for the web application with test scripts generated using at least the page objects in the different programming languages.

9. The method of claim 8, wherein the generic page object representation is agnostic to any programming language.

10. The method of claim 9, wherein the generic page object representation is generated based on a page object model.

11. The method of claim 10, wherein the generic page object representation is generated based on prior generation of a plurality of page object representations.

12. The method of claim 11, wherein the generic page object representation is generated by a neural network trained using at least the prior generation of the plurality of page object representations.

13. The method of claim 12, further comprising:
storing the page objects in the different programming languages in a database to be accessed by the test scripts.

14. The method of claim 13, wherein the data interchange format is JavaScript Object Notation (JSON), and wherein a first page object is generated by a first instance of a page object compiler and a second page object is generated by a second instance of the page object compiler.

15. A computer program product for performing user interface (UI) test automation comprising computer-readable program code to be executed by one or more processors when retrieved from a non-transitory computer-readable medium, the program code including instructions to:
obtain a document object model (DOM) associated with a web application, the web application including one or more web pages;
generate a generic page object representation based at least on the DOM, the generic page object representation associated with a web page of the web application, the generic page object representation generated using a data interchange format;
generate, by a plurality of instances of a page object compiler, a plurality of page objects based on the generic page object representation in different programming languages, the page objects associated with the web page of the web application; and
perform UI test automation for the web application with test scripts generated using at least the page objects in the different programming languages.

16. The computer program product of claim 15, wherein the generic page object representation is agnostic to any programming language.

17. The computer program product of claim 16, wherein the generic page object representation is generated based on a page object model.

18. The computer program product of claim 17, wherein the generic page object representation is generated based on prior generation of a plurality of page object representations.

19. The computer program product of claim 18, wherein the generic page object representation is generated by a neural network trained using at least the prior generation of the plurality of page object representations.

20. The computer program product of claim 19, further comprising instructions to:
store the page objects in the different programming languages in a database to be accessed by the test scripts.

* * * * *